United States Patent [19]
Sokolowski

[11] Patent Number: 5,636,916
[45] Date of Patent: Jun. 10, 1997

[54] BOAT SAFETY LIGHTING APPARATUS AND METHOD OF USING SAME

[76] Inventor: Stanley Sokolowski, 18142 Sacramento, Homewood, Ill. 60430

[21] Appl. No.: 302,347

[22] Filed: Sep. 7, 1994

[51] Int. Cl.[6] ............................................. B60Q 1/00
[52] U.S. Cl. ........................ 362/61; 362/80; 362/251; 340/984
[58] Field of Search ........................ 362/61, 80, 251, 362/231, 249; 340/456, 463, 464, 984, 986, 987

[56] References Cited

U.S. PATENT DOCUMENTS

| | | | |
|---|---|---|---|
| 3,043,949 | 7/1962 | Smith | 362/61 |
| 3,109,158 | 10/1963 | Coombs | 340/464 |
| 4,447,860 | 5/1984 | Stone et al. | 362/61 |
| 4,884,173 | 11/1989 | Cassidy | 362/61 |
| 5,335,149 | 8/1994 | Evans | 362/61 |

Primary Examiner—Ira S. Lazarus
Assistant Examiner—Alfred Basichas
Attorney, Agent, or Firm—Potthast & Ring

[57] ABSTRACT

This invention provides an improved boat lighting system which includes a mounting bracket secured to the boat to position a portion of the bracket closer to one of the port and starboard side of the boat and to position the portion at an elevation above the hull and have a light emitting element secured to the portion and positioned on the bracket to illuminate in the direction of the bow and ahead of the bow and having a directional light emitting element secured to the bracket which is one of a starboard green and port red color and energizing only one of said light emitting element and said directional light emitting element at a time. This invention provides an improved motorboat lighting system in which the motorboat has a transmission which includes a light emitting warning element secured to the motorboat and an apparatus for automatically energizing the light emitting warning element in response to a transmission position of the motorboat. Finally, this invention provides a method for warning boats in the vicinity of a motorboat having a transmission which includes providing a light emitting warning element positioned on the motorboat to illuminate in an outward direction from the motorboat and connecting the light emitting warning element to a power source with a circuit, and providing a switch in the circuit to close the circuit and energize and illuminate the light emitting warning element with the transmission in a particular position.

29 Claims, 4 Drawing Sheets

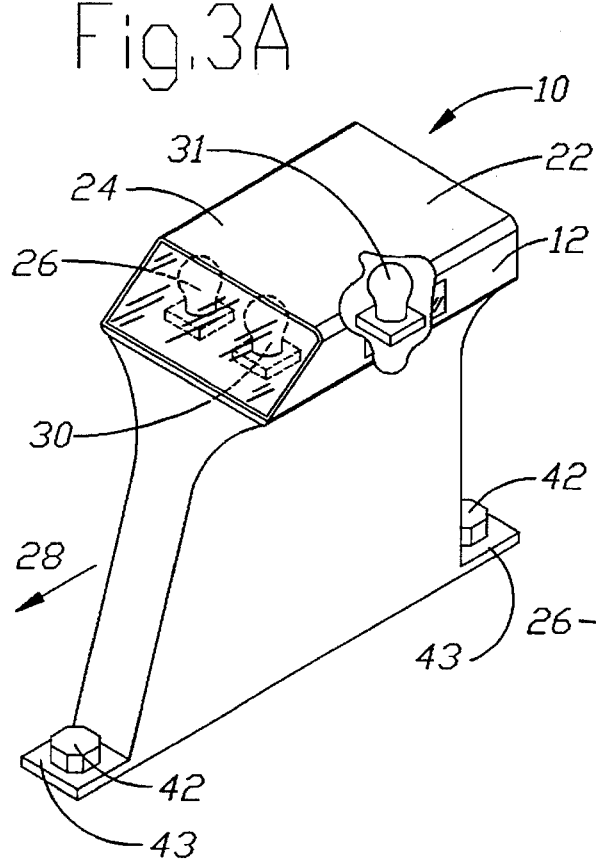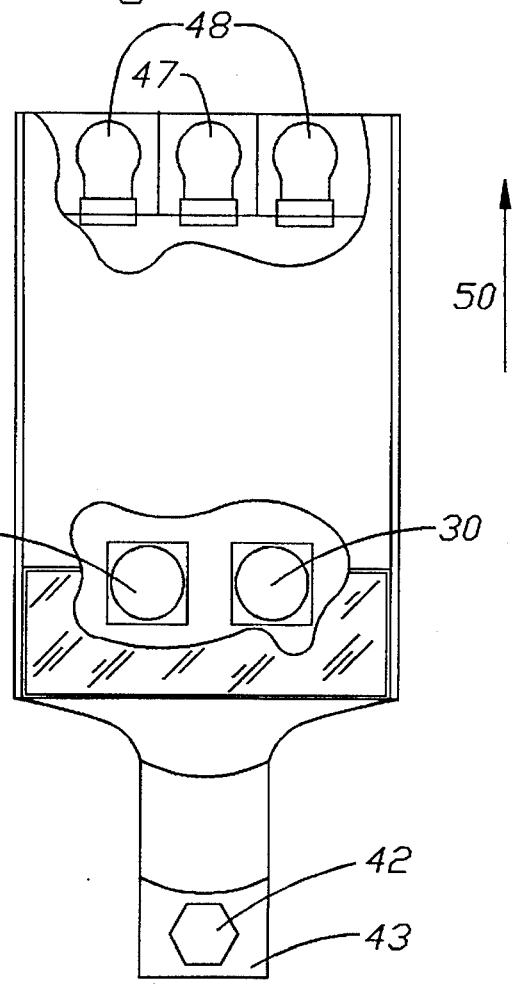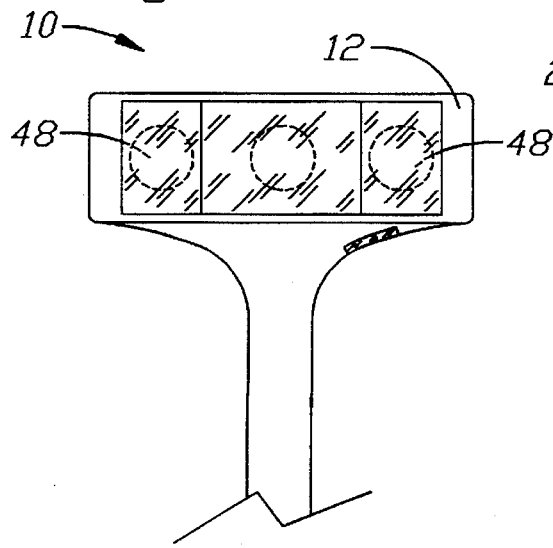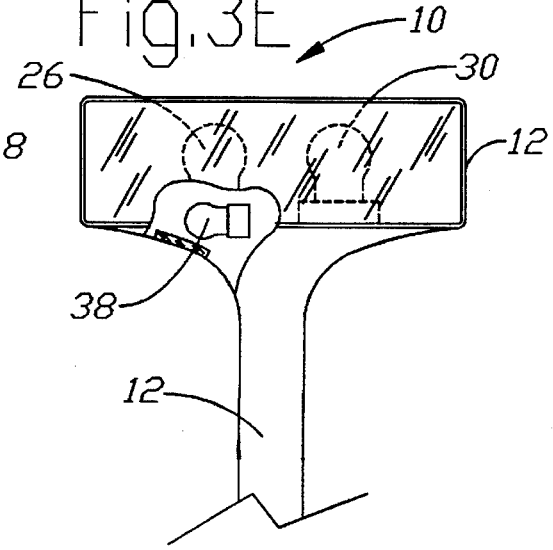

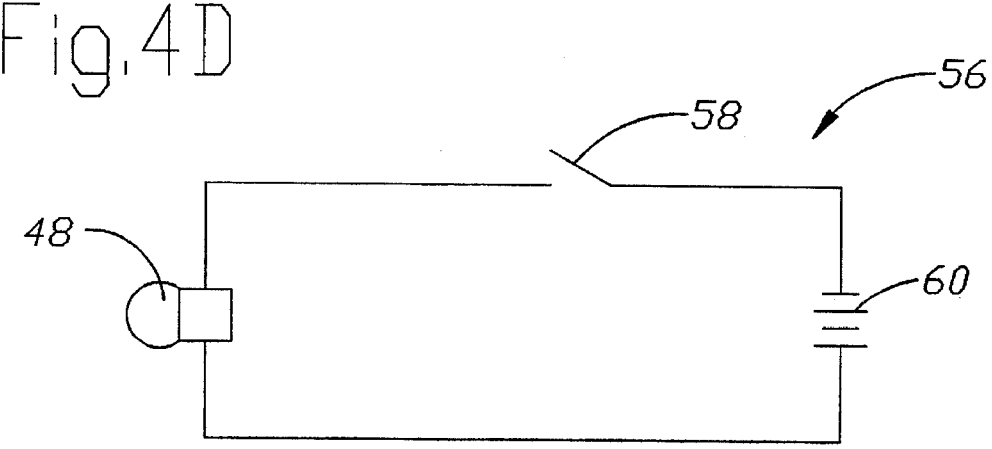
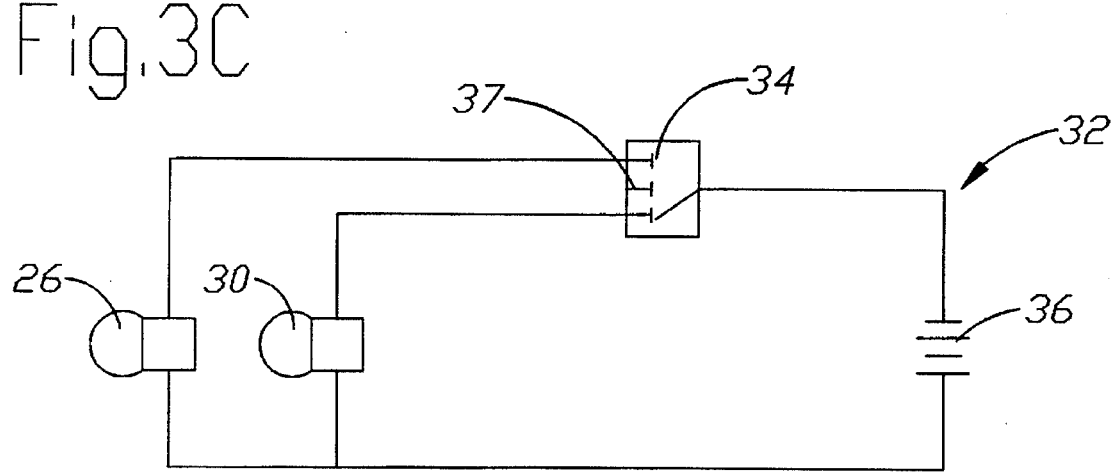

BOAT SAFETY LIGHTING APPARATUS AND METHOD OF USING SAME

BACKGROUND OF THE INVENTION

1. Field of the Invention

The present invention relates to an improved lighting system for boats and more particularly to lighting systems on a boat for warning other boats in the vicinity.

2. Description of the Related Art Including Information Disclosed under 37 CFR 1.97–1.99

The increasing popularity of boating has created a substantial need for improved safety feature and warning light systems for boats. This is especially important for people who use their boats during twilight and nighttime hours or are on the lakes and oceans during windy or poor weather conditions and especially for fishermen who often fish from boats which are substantially stationary in the water.

Conventional light assemblies are well known in the prior art for boats, such as lights for illuminating the area of the bow and forward of the bow for docking and lights that indicate their position in the water such as traditional port (red) and starboard (green) lights typically located at the bow of the boat. The color of the red lights located on the port side of the boat and the color of the green lights located on the starboard side of the boat are required or established for safety reasons by appropriate laws and regulations affecting watercraft and the safe operation thereof.

In most boats, the port and starboard lights are arranged at the break of the bow. However, these starboard and port bow lights suffer the disadvantage that, due to their height, such starboard and port bow lights have a much lower visibility when the boat moves over and through rough waters. This lower visibility creates a safety problem in that such assemblies are not easily seen by other boats in the vicinity. This safety problem becomes even more acute with more modern low slung hulls. These conditions are further compounded at night when it is important for boaters to be able to see other boats at a great distance as possible to avoid collisions.

Moreover, if the port and starboard lights are placed along the sides of the boat above the hull for better visibility, the docking lights must be separated from the port and starboard lights to prevent the blending of the port and starboard lights with the docking light when attempting to view them at great distances. Thus, smaller boats are not presently equipped with docking lights and starboard and port lights due to the logistics of putting docking lights with the starboard and port lights.

In U.S. Pat. No. 328,069 issued to Parry teaches auxiliary moveable or independent signal-lights arranged upon the boat with respect to the regular port and starboard lights required by law in which they are secured above the hull and exposed to view from the sides as the boat swings around one or more points, and remain in view until the boat has turned, thereby indicating to an observer on another boat the relative direction of movement or course of the other. However, this patent teaches that the port and starboard lights must be the same color as the auxiliary lights to prevent their blending at great distances.

In an attempt to solve both the safety and transportation problems commonly associated with having port and starboard lights only at the bow is to extend these lights above the hull on the respective sides of the boat. However, if the boat has docking lights, as relatively large boats do, dangerous blending of the port and starboard lights with the docking lights will occur if used at the same time.

Even further warning lighting assemblies for the stern of the boat are known which include long poles or rods which are mounted to the stern of the boat at an appropriate location. See U.S. Pat. No. 4,856,452 issued to Pingel et al. The length of such poles or rods are usually required or established for safety reasons by appropriate laws and regulations affecting watercraft and the safe operation thereof. One of the main problems with attaching warning stern lights only to the upper portion of relatively long support assemblies is that these warning stern lights do not indicate if the boat is in a stationary position or heading backwards. This is particularly worrisome for fishermen who must "idle" their boats in the water. These conditions are compounded at night when it is important for boaters to be able to see other boats and to determine if the boats are "idled", travelling forward or travelling backwards.

SUMMARY OF THE INVENTION

It is therefore the object of this invention to provide an apparatus for an improved boat lighting system which includes a mounting bracket secured to the boat to position at least a portion of the bracket closer to one of the port and starboard side of the boat than to other of said port and starboard side of the boat and to position the portion at an elevation above the hull of the boat and a light emitting element secured to the portion of the bracket and positioned on the bracket to illuminate in the direction of the bow and ahead of the bow of the boat, and directional light emitting element secured to the bracket and in which the directional light emitting element is one of a starboard green and port red color and energizing only one of said light emitting element and said directional light emitting element at a time.

It is a further object of this invention to provide an improved motorboat lighting system in which the motorboat has a transmission which includes a light emitting warning element secured to the boat and an apparatus for automatically energizing the light emitting warning element in response to a transmission position of the motorboat.

It is another object of this invention to provide a method for warning boats in the vicinity of a motorboat having a transmission which includes providing a light emitting warning element positioned on the motorboat to illuminate in an outward direction from the motorboat and connecting the light emitting warning element to a power source with a circuit, and providing a switch in the circuit to close the circuit and energize and illuminate the light emitting warning element with the transmission in a particular position.

BRIEF DESCRIPTION OF DRAWING

The foregoing objects and advantageous features of the invention will be explained in greater detail and others will be made apparent from the detailed description of the preferred embodiments of the present invention which are given reference to the several figures of the drawing, in which:

FIG. 3A is a perspective view of the port lighting system of the present invention;

FIG. 3B is a top plan view of the lighting system of FIG. 3A with partial cutaways;

FIG. 3C is a schematic of the lighting system of FIG. 3A for the light emitting element and the directional light emitting element;

FIG. 3D is a partial rear elevational view of the lighting system of FIG. 3A;

FIG. 3E is a partial front elevational view with a partial cutaway view of the lighting system of FIG. 3A showing the interior light emitting element;

FIG. 4D is a schematic of the warning light associated with the gear shift of FIG. 4A.

DETAILED DESCRIPTION

Figures 1, 2:
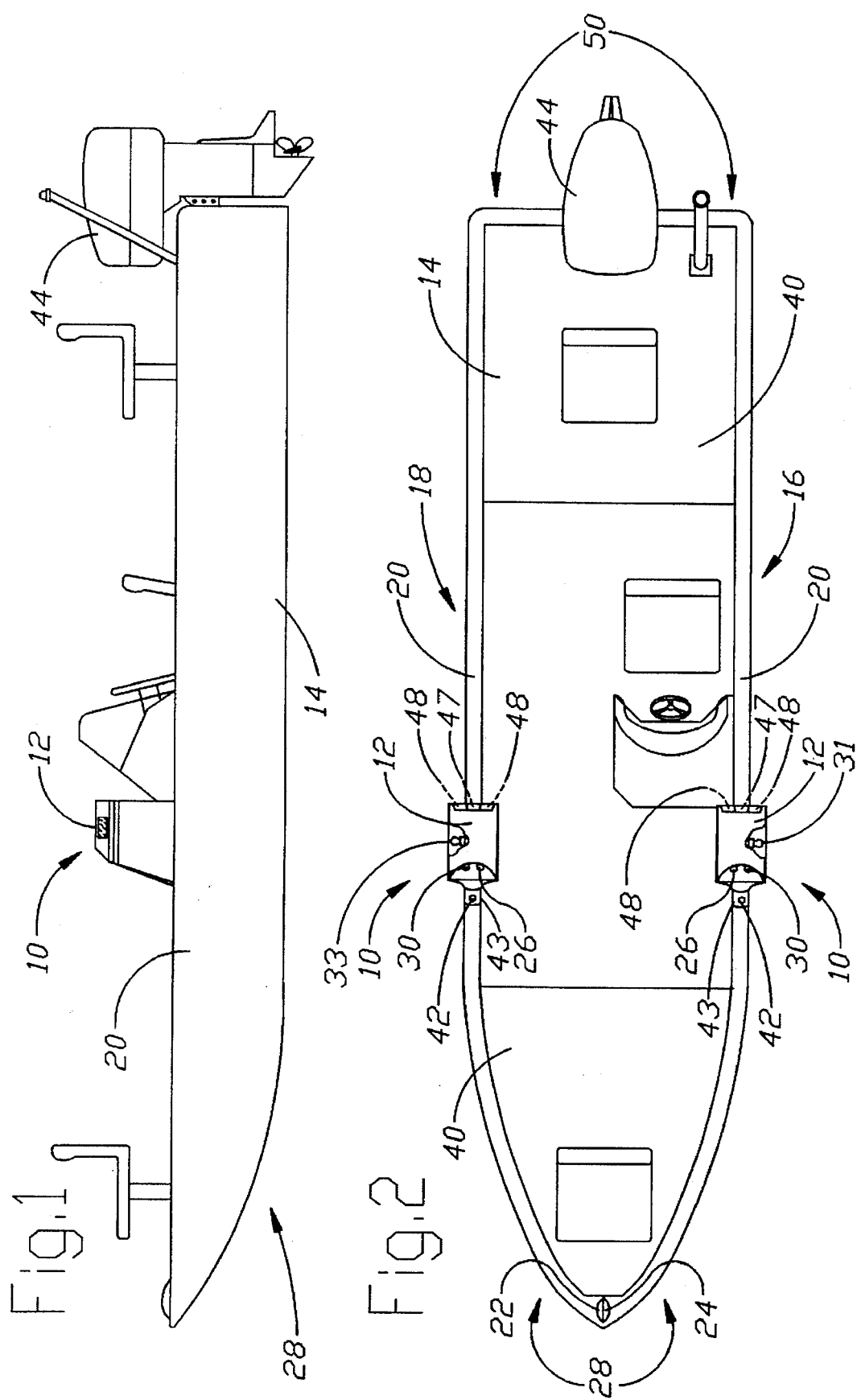
FIG. 1 is a side elevational view of a boat with the invention mounted thereto.
FIG. 2 is a top plan view of the boat in FIG. 1.

Referring now to FIGS. 1 and 2 of the drawings, improved boat lighting system 10, having mounting bracket 12 secured to boat 14 to position at least a portion of bracket 12 closer to one of the port 16 and starboard 18 side of boat 14 than to other of said port 16 and starboard side 18 of boat 14.

Referring to FIGS. 2 and 3A, mounting bracket 12 is secured directly to one of port side 16 and starboard side 18 of hull 20. Mounting bracket 12 is positioned at an elevation above hull 20 of boat 14 in order that it can be seen in rough, wavy water or in rainy or foggy weather. Further, mounting bracket 12 is releasably secured to boat 14 hull 20 with screws 42 and securement portion 43 or other common releasable securing apparatus known in the art in order that mounting bracket 12 may be quickly and easily attached or detached to and from hull 20 of boat 14, as the case may be.

Still referring to FIG. 2, improved boat lighting system 10 includes two mounting brackets 12 secured to boat 14 in which the portion of each bracket 12 is positioned to have one portion closer to port side 16 of boat 14 than to starboard side 18 of boat 14 and other portion at a position closer to starboard side 18 of boat 14 than to port side 16 of boat 14.

Referring to FIGS. 2 and 3A, improved boat lighting system 10 includes light emitting element 26 secured to portion of bracket 12 and positioned on bracket 12 to illuminate in the direction of bow 28 and direction of bow 28 by arrow 28 in FIG. 3A and ahead of bow 28 of boat 14. Light emitting element 26 is typically a bright white light or the like which is used to illuminated ahead of boat 14 to assist the driver of boat 14 in docking boat 14 at night and also assists the driver of boat 14 in maneuvering boat 14 in more narrow passages or along shore at night. Thus, light emitting element 26 adds to the safety and transportation efficiency of boat 14.

Improved boat lighting system also includes directional light emitting element 30 secured to mounting bracket 12. Directional light emitting element 30 is one of starboard green and port red color. Starboard green is used to indicate to other boaters where the right side of boat 14 is and is secured to bracket 12 closest to starboard side 18 and port red is used to indicate to other boaters the left side of boat 14 and is secured to bracket 12 closest to port side 16 of boat 14.

Still referring to FIG. 2, portion of mounting bracket closer to the starboard side 18 of boat 14 has green directional light emitting element 33 secured to said portion of mounting bracket 12 closer to starboard side 18 and positioned thereon to illuminate toward starboard side 18 of boat 14 and beyond starboard side 18 of boat 14.

Referring to FIGS. 2 and 3A, portion of the mounting bracket closer to the port side 16 to boat 14 has a red directional light emitting element 31 secured to said portion of the mounting bracket 12 and positioned thereon to illuminate toward port side 16 of boat 14 and beyond port side 16 of boat 14.

Thus, if a boater in the vicinity was heading generally head-on into boat 14, the boater would see green starboard bow and red portal bow lights 22 and 24, respectively. However, as boat 14 changes direction relative to the boater, if the boater in the vicinity would see red direction light emitting element 30, boat 14 was turning left in relationship to the boater and if the boater would see green directional light emitting element 30, boat 14 was turning right in relationship to the boater. Thus, the directional light emitting element 30 is very important for boaters to determine the orientation of other boats on the waterways so that accidents can be avoided.

Further, the fact that directional light emitting element 30 is secured to bracket 12 in an elevated position above hull 20 make directional light emitting element 30 more visible to boaters at greater distances and during bad weather and therefore are better able to warn boaters of the orientation of boat 14 in time to avoid collisions than the traditional bow lights.

Referring to FIGS. 3A and 3C, improved boat lighting system 10 includes means for energizing only one of said light emitting element 26 and said directional light emitting element 30 at a time. The means for energizing only one of said light emitting element 26 and said directional light emitting element 30 at a time includes electrical circuit 32 connecting said light emitting element 26 and said directional light emitting element 30 to power source 36 which includes switch 34 which alternately closes circuit 32 between only one of said light emitting element 26 and said directional light emitting element 30 with said power source 36. Such power source is typically a battery. Further, switch 34 includes a neutral position 37 thereby not illuminating either lights 26 or 30.

Only one of said light emitting element 26 and said directional light emitting element 30 is energized at a time because they are both on the same or proximate elevational level and if both light emitting element 26 and directional light emitting element 30 were on at the same time, these port and starboard lights 30 would blend with light emitting element 26 at great distances and other boaters would not be able to differentiate between whether they were viewing a red port light of a green starboard light rather than a white light emitting illuminating the bow area so the boaters in the vicinity would not be able to discern if they were looking at the front of the boat or the port side or the starboard side of the boat. Thus, it is very important for safety reasons to only use one of the light emitting element 26 or the directional light emitting element 30 at a time.

Referring to FIG. 3E, improved lighting system 10 has interior light emitting element 38 secured to mounting bracket 12 and is positioned to illuminate in a direction toward deck 40 of boat 14. Interior light emitting element 38 is utilized to illuminate the interior of the boat toward the deck area. Since interior light emitting 38 is secured to mounting bracket 12 which is releasably secured to hull 20 by screws 42, it may be quickly disassembled to permit the device to be quickly and easily attached or detached to or from hull 20 of boat 14.

Referring to FIGS. 2, 3B, 3D and 4A, improved lighting system 10 for boat 14 which has motor 44 and a transmission and light emitting warning element 48 secured to bracket 12 and directed to illuminate toward stern 50 of boat 14 and beyond stern 50 of boat 14. In FIG. 3B, the direction of stern 50 is indicated by an arrow.

Figure 4A:
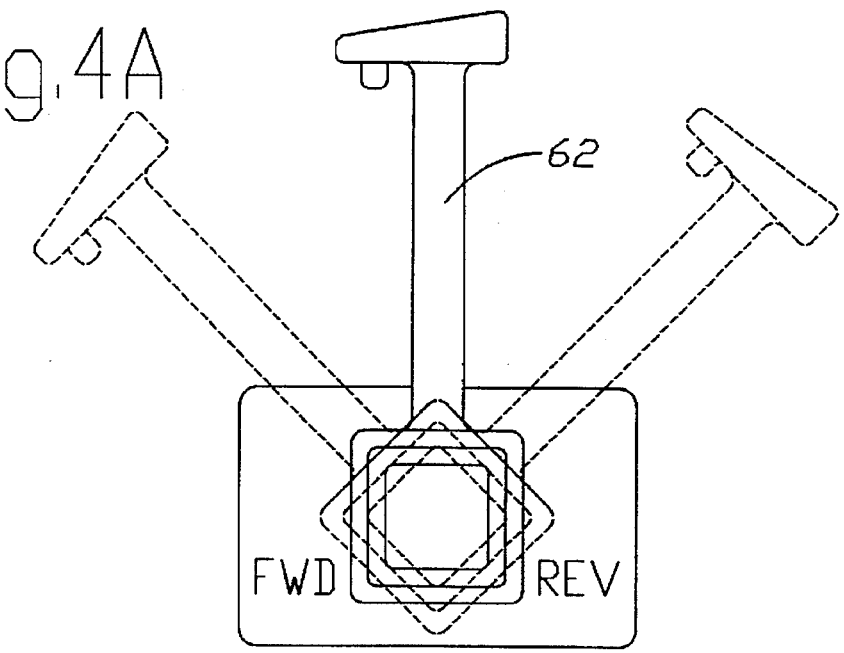
FIG. 4A is a side elevational view of a gear shift of a boat.
Figure 4B:
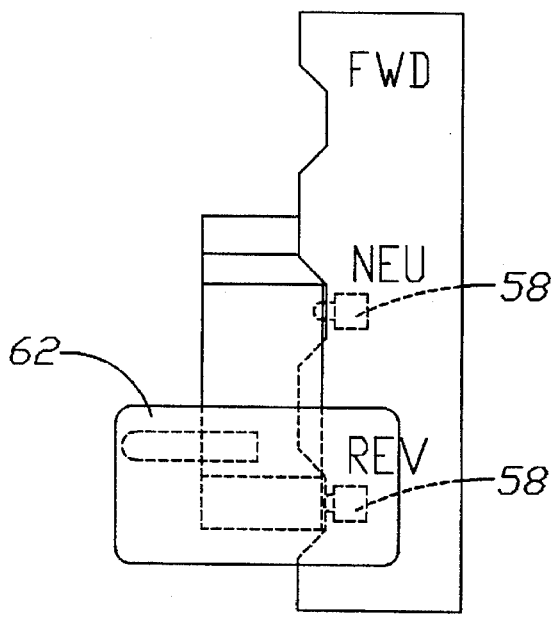
FIG. 4B is a partial top plan view of the gear shift of FIG. 4A with the gear shift handle in a reverse position.
Figure 4C:
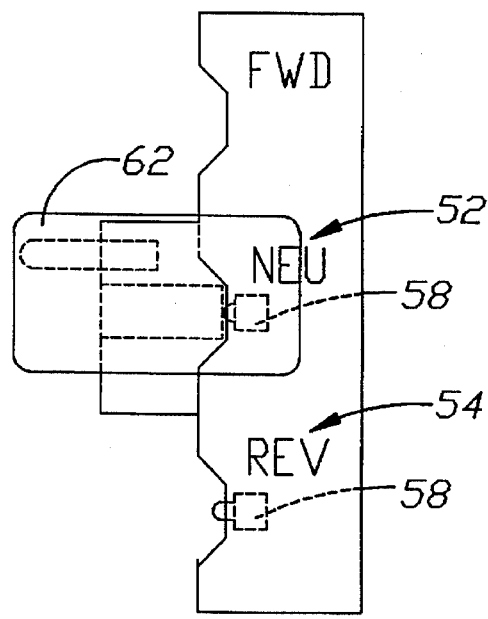
FIG. 4C is a partial top plan view of the gear shift of FIG. 4B with the gear shift handle in a neutral position.

Referring to FIGS. 4B, 4C and 4D, improved lighting system 10 also includes means for automatically energizing light emitting warning element 48 in response to a particular transmission position, such as one of neutral 52 and reverse 54.

Now referring to FIGS. 2, 4A–4D, another embodiment of the present invention includes improved motorboat lighting system 10 in which motorboat 14 has a transmission having light emitting warning element 48 secured to motorboat and means for automatically energizing light emitting warning element 48 in response to a position of the transmission of motorboat 14 being in one of neutral position 52 or in reverse position 54.

Light emitting warning element 48 is secured to a portion of mounting bracket 12 in which mounting bracket 12 is secured to motorboat 14. Mounting bracket 12 is elevated above hull 20 of motorboat 14 for the same safety reasons as set forth above for the first embodiment of the invention.

Light emitting warning element 48 is positioned on the portion of the bracket 12 to illuminate in a direction toward at least one of stern 50, bow 28, port 16 and starboard 18 sides of motorboat 14. Light emitting warning element 48 is a flashing light which is yellow. Light emitting warning light 48 is also non-flashing and remains constant and is any color that would attract attention of boaters in the vicinity. Light emitting warning element 48 also has audible warnings associated with it for additional notifying and cautioning of other boaters in the vicinity that motorboat 14 is in neutral 52 or reverse 54.

Referring to FIG. 2, improved motorboat lighting system 10 of the present embodiment similarly includes light emitting element 26 secured to portion of mounting bracket 12 and positioned to illuminate in the direction of and beyond bow 28 as described above.

Referring to FIGS. 2, 3A and 3B, improved motorboat lighting system 10 of the present embodiment has two mounting brackets 12 secured to motorboat 14 in which the portion of each bracket 12 is positioned to have one portion closer to port side 16 of motorboat 14 than starboard side 18 of motorboat 14 and other portion positioned closer to starboard at a side 18 of motorboat 14 than to port side 16 of motorboat 14.

Still referring to FIGS. 2, 3A and 3B, improved motorboat lighting system 10 of the present embodiment similarly includes red directional light emitting element 30 secured to portion of the bracket positioned closer to port side 16 of motorboat 14 and green directional light emitting element 30 secured to portion of the other bracket positioned closer to starboard side 18 of motorboat 14.

Red directional light emitting elements are positioned on bracket 12 to illuminate in at least one of the directions of the stern 50, bow 28 and port side 16 having corresponding light emitting elements 47, 30 and 31 of motorboat 14. Green directional light emitting elements are positioned on 12 bracket to illuminate in at least one of the directions of the stern 50, bow 28 and starboard side 18 having corresponding light emitting elements 47, 30 and 33 of motorboat 14.

The means for energizing light emitting warning element 48 includes electrical circuit 56, as shown in FIG. 4D, connecting light emitting warning element 48 to power source 60 and includes switch 58, which in its normal position is open, and when switch 58 is closed in response to transmission shift handle 62 being in one of neutral 52 and reverse 54 position, the circuit 56 closes with said power source 60 and illuminates light emitting warning element 48.

Thus when boaters "idle" their boats or are backing their boats up in the water, other boaters in their vicinity will be able to determine the boat is in neutral or reverse because of light emitting warning element 48 being illuminated.

Still referring to FIGS. 4A–4C, improved motorboat lighting system 10 in which switch 58 is secured to and positioned on motorboat 14 to engage transmission gear shift handle 62 with handle 62 positioned in one of neutral 52 and reverse 54 position to close switch 58. Switch 58 is a mechanical plunger switch which is closed by transmission gear shift handle 62 in one of neutral 52 and reverse 54 position.

The present invention includes a method for warning boats in the vicinity of motorboat 14 having transmission 46, which includes the steps of providing light emitting warning element 48 positioned on motorboat 14 to illuminate in an outward direction from the motorboat 14, connecting light emitting warning element 48 to power source 60 with circuit 56 and providing switch 58 in circuit 56 to close circuit 56 and energize and illuminate light emitting warning element 48 with transmission 46 of motorboat 14 in one of neutral 52 and reverse 54 position.

While a detailed description of the preferred embodiments of the invention have been given, it should be appreciated that many variations can be made thereto without departing from the scope of the invention as set forth in the appended claims.

I claim:

1. A method for warning boats in the vicinity of a motorboat having a transmission, comprising the steps of:

providing a light emitting warning element positioned on the motorboat to illuminate in an outward direction from the motorboat;

connecting the light emitting warning element to a power source with a circuit; and providing a switch in the circuit to close the circuit and energize and illuminate the light emitting warning element in response to a transmission position of the motorboat.

2. The method for warning boats of claim 1 includes a position of transmission is one of neutral and reverse.

3. A boat lighting system, comprising:

a mounting bracket secured to the boat to position at least a portion of the bracket closer to one of a port and starboard side of the boat than to other of said port and starboard side of the boat and to position the portion of the bracket at an elevation above the hull of the boat;

a light emitting element secured to the portion of the bracket and positioned on the bracket to illuminate in a direction of a bow and ahead of the bow of the boat;

a directional light emitting element secured to the bracket and in which the directional light emitting element is one of a starboard green and port red color; and means for energizing only one of said light emitting element and said directional light emitting element at a time.

4. The lighting system of claim 1 in which the mounting bracket is secured directly to one of the port and starboard side of a hull.

5. The lighting system of claim 1 in which an interior light emitting element is secured to the mounting bracket and is positioned to illuminate in a direction toward a deck of the boat.

6. The lighting system of claim 1 in which the means for energizing only one of said light emitting element and said directional light emitting element at a time includes an electrical circuit connecting said light emitting element and said directional light emitting element to a power source which includes a switch which alternately closes the circuit between only one of said light emitting element and said directional light emitting element with said power source.

7. The lighting system of claim 1 in which said boat includes a motor and transmission and a light emitting warning element secured to the bracket and directed to illuminate toward a stern of the boat and beyond the stern of the boat and a means for automatically energizing the light emitting warning element in response to a particular transmission position.

8. The lighting system of claim 7 in which said particular transmission position is one of neutral and reverse.

9. The boat lighting system of claim 1 in which there are two mounting brackets secured to the boat in which the portion of each bracket is positioned to have one portion closer to the port side of the boat than to the starboard side of the boat and another portion at a position closer to the starboard side of the boat than to the port side of the boat.

10. The boat lighting system of claim 9 in which the portion of the mounting bracket closer to the starboard side of the boat has a green directional light emitting element secured to said portion of the mounting bracket and positioned thereon to illuminate toward the bow of the boat and in front of the bow of the boat.

11. The lighting system of claim 9 in which the portion of the mounting bracket closer to the port side to the boat has a red directional light emitting element secured to said portion of the mounting bracket and positioned thereon to illuminate toward the bow of the boat and in front of the bow of the boat.

12. The lighting system of claim 9 in which the portion of the mounting bracket closer to the starboard side of the boat has a green directional light emitting element secured thereto and positioned thereon to illuminate in a direction of the starboard side of the boat and beyond the starboard side of the boat.

13. The lighting system of claim 9 in which the portion of the mounting bracket closer to the port side of the boat has a red directional light emitting element secured thereto and positioned on the portion of the mounting bracket to illuminate toward the port side of the boat and beyond the port side of the boat.

14. A motorboat lighting system in which the motorboat has a transmission, comprising:

a light emitting warning element is secured to a portion of a mounting bracket which is secured to the motorboat, in which said portion is positioned elevated above the hull of the motorboat and positioned closer to one of a port and starboard side of the motorboat and in which said portion will support one of a green and red directional light emitting element for said portion positioned to one of said starboard and port side respectively; and a means for automatically energizing the light emitting warning element in response to a transmission position of the motorboat.

15. The motorboat lighting system of claim 14 in which a position of transmission is one of neutral and reverse.

16. The motorboat lighting system of claim 14 in which the light emitting warning element is a flashing light.

17. The motorboat lighting system of claim 16 in which the flashing light is yellow.

18. The motorboat lighting system of claim 14 in which the automatic energizing means includes an electrical circuit between an electrical power source and the light emitting warning element and an electrical switch in the electrical circuit in association with the transmission being in one of a neutral or reverse position.

19. The motorboat lighting system of claim 18 in which the normal position of the switch is open and in which a closed position of said switch closes said electrical circuit and energizes and illuminates the light emitting warning element in response to the transmission being in one of neutral and reverse position.

20. The motorboat lighting system of claim 19 in which the switch is secured to and positioned on the motorboat to engage a transmission gear shift handle with the handle positioned in one of the neutral and reverse position to close the switch.

21. The motorboat lighting system of claim 20 in which the switch is a mechanical plunger switch which is closed by the transmission gear shift handle in one of neutral and reverse position.

22. The improved motorboat lighting system of claim 14 includes a mounting bracket secured to the motorboat and the light emitting warning element secured to a portion of the mounting bracket.

23. The improved motorboat lighting system of claim 22 in which the portion of the mounting bracket is elevated above the hull of the motorboat.

24. The motorboat lighting system of claim 22 in which the light emitting warning element is positioned on the portion of the bracket to illuminate in a direction toward at least one of a stern, bow, port and starboard sides of the motorboat.

25. The motorboat lighting system of claim 22 includes a light emitting element secured to the portion of the mounting bracket and positioned to illuminate in the direction of and beyond a bow.

26. The motorboat lighting system of claim 14 in which there are two mounting brackets secured to the motorboat in which the portion of each bracket is positioned to have one portion closer to a port side of the motorboat than a starboard side of the motorboat and the other portion at a position closer to the starboard side of the motorboat than the port side of the motorboat.

27. The motorboat lighting system of claim 26 includes a red directional light emitting element secured to the portion of the bracket positioned closer to the port side of the motorboat and a green directional light emitting element secured to the portion of the other bracket positioned closer to the starboard side of the motorboat.

28. The motorboat lighting system of claim 27 includes at least one red directional light emitting element positioned on the bracket to illuminate in at least one of the directions of the stern, bow and port side of the motorboat.

29. The motorboat lighting system of claim 27 includes at least one green directional light emitting element positioned on the bracket to illuminate in at least one of the directions of the stern, bow and starboard side of the motorboat.

* * * * *